(12) United States Patent
Lee

(10) Patent No.: US 10,989,525 B2
(45) Date of Patent: Apr. 27, 2021

(54) LASER GUIDED SCANNING SYSTEMS AND METHODS FOR SCANNING OF SYMMETRICAL AND UNSYMMETRICAL OBJECTS

(71) Applicant: Guangdong Kang Yun Technologies Limited, Guangzhou (CN)

(72) Inventor: Seng Fook Lee, Guangzhou (CN)

(73) Assignee: Guangdong Kang Yun Technologies Limited, Guangzhou (CN)

( * ) Notice: Subject to any disclaimer, the term of this patent is extended or adjusted under 35 U.S.C. 154(b) by 0 days.

(21) Appl. No.: 16/616,169

(22) PCT Filed: Jun. 15, 2018

(86) PCT No.: PCT/CN2018/091526
§ 371 (c)(1),
(2) Date: Nov. 22, 2019

(87) PCT Pub. No.: WO2019/080515
PCT Pub. Date: May 2, 2019

(65) Prior Publication Data
US 2020/0141720 A1 May 7, 2020

Related U.S. Application Data
(60) Provisional application No. 62/577,735, filed on Oct. 27, 2017.

(51) Int. Cl.
*G01B 11/245* (2006.01)
*G01B 11/00* (2006.01)
*G02B 26/10* (2006.01)

(52) U.S. Cl.
CPC .......... *G01B 11/245* (2013.01); *G01B 11/002* (2013.01); *G02B 26/10* (2013.01)

(58) Field of Classification Search
CPC .... G01B 11/245; G01B 11/002; G02B 26/10; G03B 35/02; A61B 6/022; H04N 13/221
See application file for complete search history.

(56) References Cited

U.S. PATENT DOCUMENTS

2007/0058175 A1* 3/2007 Maierhofer .......... G01B 11/002
356/601
2011/0316963 A1* 12/2011 Li ........................ H04N 13/243
348/14.1

(Continued)

FOREIGN PATENT DOCUMENTS

| CN | 103091966 A | 5/2013 |
| CN | 104333747 A | 2/2015 |

(Continued)

*Primary Examiner* — Alexander Gee

(57) ABSTRACT

Systems and methods for scanning of a plurality of objects are disclosed. A laser guided scanning system for scanning includes a laser light configured to switch from a first color to a second color to indicate an exact position to a user for taking a number of shots comprising at least one image of an object. The laser guided scanning system further includes one or more cameras to capture the shots based on an indication from the laser light. The laser guided scanning system also includes a processor to: define a laser center co-ordinate for the object from a first shot of the plurality of shots, wherein the processor defines the exact position for taking the subsequent shot without disturbing the laser center co-ordinate for the object; and stitch and process the plurality of shots to generate at least one 3D model comprising a scanned image of the object.

8 Claims, 9 Drawing Sheets

(56) References Cited

U.S. PATENT DOCUMENTS

| | | | | |
|---|---|---|---|---|
| 2015/0195434 A1* | 7/2015 | Kwon | ................ | G06K 9/00255 |
| | | | | 348/46 |
| 2016/0335809 A1* | 11/2016 | Forutanpour | ........... | G06T 7/579 |
| 2018/0180408 A1* | 6/2018 | Du | ..................... | G01B 11/2522 |

FOREIGN PATENT DOCUMENTS

| | | |
|---|---|---|
| CN | 105203046 A | 12/2015 |
| CN | 105865350 A | 8/2016 |
| CN | 106408664 A | 2/2017 |
| CN | 106500627 A | 3/2017 |
| CN | 108317954 A | 7/2018 |
| WO | 2014121278 A1 | 8/2014 |

\* cited by examiner

100

400

LASER GUIDED SCANNING SYSTEMS AND METHODS FOR SCANNING OF SYMMETRICAL AND UNSYMMETRICAL OBJECTS

CROSS REFERENCE TO RELATED APPLICATIONS

This application is a national stage application under 35 U.S.C. 371 of PCT Application No. PCT/CN2018/091526, filed 15 Jun. 2018, which PCT application claimed the benefit of U.S. Provisional Patent Application No. 62/577,735, filed 27 Oct. 2017, the entire disclosure of each of which are hereby incorporated herein by reference.

TECHNICAL FIELD

The presently disclosed embodiments relate to the field of imaging and scanning technologies. More specifically, embodiments of the present disclosure relate to laser guided scanning systems and methods for scanning of objects comprising symmetrical and unsymmetrical objects.

BACKGROUND

A three-dimensional (3D) scanner may be a device capable of analysing environment or a real-world object for collecting data about its shape and appearance, for example, colour, height, length width, and so forth. The collected data may be used to construct digital three-dimensional models. Usually, 3D laser scanners create "point clouds" of data from a surface of an object. Further, in the 3D laser scanning, physical object's exact size and shape is captured and stored as a digital 3-dimensional representation. The digital 3-dimensional representation may be used for further computation. The 3D laser scanners work by measuring a horizontal angle by sending a laser beam all over the field of view. Whenever the laser beam hits a reflective surface, it is reflected back into the direction of the 3D laser scanner.

In the present 3D scanners or systems, there exist multiple limitations. For example, a higher number of pictures need to be taken by a user for making a 360-degree view. Also the 3D scanners take more time for taking or capturing pictures. Further, a stitching time is more for combining the more number of pictures (or images). Similarly, the processing time for processing the more number of pictures increases. Further, because of more number of pictures, the final scanned picture becomes heavier in size and may require more storage space.

SUMMARY

In light of above discussion, there exists need for better techniques for scanning and primarily 3D scanning of objects. The present disclosure provides methods and systems for laser guided 3D scanning of objects including at least one of symmetrical and unsymmetrical objects.

An objective of the present disclosure is to provide a laser guided scanning system for scanning of at least one of symmetrical and unsymmetrical objects.

Another objective of the present disclosure is to provide a method for scanning of at least one of symmetrical and unsymmetrical objects.

Another objective of the present disclosure is to provide a system for generating at least one 3D model comprising a scanned image of the object.

Another objective of the present disclosure is to indicate an exact position to the user for taking a shot of an object. This way less number of shots may be taken from the exact positions for defining a 360-degree view of the object.

Another objective of the present disclosure is to provide a method for scanning of at least one of symmetrical and unsymmetrical objects.

An objective of the present disclosure is to provide a laser guided scanning system and a method for 3 dimensional (3D) scanning of at least one of symmetrical and unsymmetrical objects.

The present disclosure provides laser guided co-ordinate systems and methods for advising an exact position to the user for taking one or more shots comprising one or more photos of an object one by one.

The present disclosure also provides systems and methods for generating 3D model including at least one scanned image of an object comprising a symmetrical and an unsymmetrical object or of an environment.

The present disclosure also provides systems and methods for generating a 3D model including scanned images of object(s) by allowing the user to click a less number of images or shots for completing a 360-degree view of the object.

An embodiment of the present disclosure provides a laser guided scanning system for scanning of a plurality of objects. The laser guided scanning system includes a laser light configured to switch from a first color to a second color to indicate an exact position to a user for taking a plurality of shots comprising at least one image of the object. The laser guided scanning system further includes one or more cameras configured to capture the plurality of shots based on an indication from the laser light. The laser guided scanning system also includes a processor configured to: define a laser center co-ordinate for the object from a first shot of the plurality of shots, wherein the processor defines the exact position for taking the subsequent shot without disturbing the laser center co-ordinate for the object; and stitch and process the plurality of shots to generate at least one 3D model comprising a scanned image of the object.

Another embodiment of the present disclosure provides a system for 3 dimensional (3D) scanning of an object. The system includes a laser light configured to switch from a red color to a green color for signaling an exact position to the user for taking each of a subsequent shot of a plurality of shots including at least one image of the object. The subsequent shot may be taken after a first shot of the plurality of shots. The system further includes one or more cameras configured to capture the plurality of shots one by one when the laser light switches to the green color. The one or more cameras may take the plurality of shots based on a laser center co-ordinate and a relative width of the first shot such that the laser center co-ordinate remains un-disturbed while taking the plurality of shots of the object. The system further includes a processor configured to: define the laser center co-ordinate for the object from the first shot, wherein the laser light indicates the exact position for taking the subsequent shot without disturbing the laser center co-ordinate of the object; and stitch and process the plurality of shots into an at least one 3D model comprising a scanned image of the object.

Another embodiment of the present disclosure provides a method for scanning of an object. The method includes capturing, by one or more cameras of a laser guided scanning system, a plurality of shots one by one based on an indication of an exact position by a laser light, wherein the laser light switches from a first color to a second color for signaling the exact position to the user for taking a subsequent shot of the plurality of shots after a first shot of the plurality of shots. The method also includes defining, by a processor of a laser guided scanning system, a laser center co-ordinate for the object from the first shot, wherein the processor defines the exact position for taking the subsequent shot without disturbing the laser center co-ordinate for the object. The method further includes stitching and processing, by the processor, the plurality of shots to generate at least one 3D model comprising a scanned image of the object.

Another embodiment of the present disclosure provides a method for three-dimensional (3D) scanning of an object. The method includes capturing, by one or more cameras of a laser guided scanning system, a plurality of shots comprising at least one image of the object one by one, wherein a laser light switches to a green color for signaling an exact position to the user for taking each of the subsequent shot of a plurality of shots based on a laser center co-ordinate and a relative width of a first shot of the plurality of shots, wherein the laser center co-ordinate is kept un-disturbed while taking the plurality of shots. The method further includes defining, by a processor of the laser guided scanning system, the laser center co-ordinate for the object from the first shot of the plurality of shots, wherein the laser light indicates the exact position for taking the subsequent shot without disturbing the laser center co-ordinate for the object. The method furthermore includes stitching and processing, by the processor, the plurality of shots into an at least one 3D model comprising a scanned image of the object.

According to an aspect of the present disclosure, the laser center co-ordinate is kept un-disturbed while taking the plurality of shots of the object.

According to another aspect of the present disclosure, wherein the object comprises at least one of a symmetrical object and an unsymmetrical object.

In some embodiments, the laser light points a green light on the exact position for signaling the user to take a next shot from the exact position. Similarly, the laser light turns points a green light for signaling a position from where the user should take a next shot of the object for completing a 360-degree view of the object.

According to an aspect of the preset disclosure, the processor may define a laser center co-ordinate for the object from a first shot of the plurality of shots, wherein the processor defines the exact position for taking the subsequent shot without disturbing the laser center co-ordinate for the object based on a green color indication by the laser light.

According to another aspect of the present disclosure, the laser light is configured to switch from a green color to a red color and vice versa. In alternative embodiments, the laser light for signaling the user may use colors other than red and green color.

According to another aspect of the present disclosure, the one or more cameras takes the plurality of shots of the object one by one based on the laser center co-ordinate and a relative width of the first shot.

According to another aspect of the present disclosure, the processor is further configured to define a new position co-ordinate for the user based on the laser center co-ordinate and the relative width of the first shot.

According to another aspect of the present disclosure, wherein the object comprises at least one of a symmetrical object and an unsymmetrical object.

According to another aspect of the present disclosure, the plurality of shots is taken one by one with a time interval between two subsequent shots.

According to another aspect of the present disclosure, a user takes a first shot, i.e. N1, of an object and the laser guided scanning system may define a laser center co-ordinate for the object based on the first shot. For the second shot, a laser light of the system may turn green from a red color for indicating an exact position to the user for the second shot i.e. N2 shot and so on for third shot (i.e. N3), fourth shot (i.e. N4), and so forth. Further, the user may require taking more than one shot for completing a 360-degree view or a 3D view of the object. The laser guided scanning system may smartly define the N2, N3, and N4 position for clicking taking shots/images.

The present disclosure provides a method and a system for scanning of at least one of a symmetrical object and an unsymmetrical object. The unsymmetrical object comprises at least one uneven surface.

According to another aspect of the present disclosure, a user may be required to take multiple shots or capture multiple images or photos of an object for completing a 360-degree view or a three-dimensional (3D) view of the object. In some embodiments, the object may be a symmetrical object. In alternative embodiments, the object may be an unsymmetrical object.

According to an aspect of the present disclosure, the processor may be configured to stitch and process the shots post scanning of the object to generate at least one 3D model comprising a scanned image.

According to an aspect of the present disclosure, the laser light may change from a green color to a red color. The green color of the laser light may signal to the user for taking shots.

According to another aspect of the present disclosure, the laser guided scanning system configured to keep the laser center co-ordinate undisturbed while taking various shots. The laser guided scanning system may take the shots based on the co-ordinate. A relative width of the shot may also help in defining the new co-ordinate of the user. Therefore, by not disturbing the laser center, the laser guided scanning system may capture the overall or complete photo of the object. Hence, there may not be a missing part of the object scanning that in turn, may increase the overall quality of the scanned image or the 3D model.

According to another aspect of the present disclosure, the one or more cameras takes the plurality of shots of the object one by one based on the laser center co-ordinate and a relative width of the first shot.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

Figure 1:
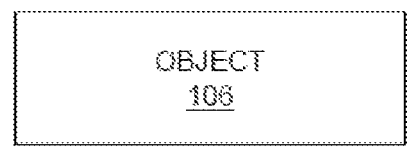
FIG. 1 illustrates an exemplary environment where various embodiments of the present disclosure may function.
Figure 1:
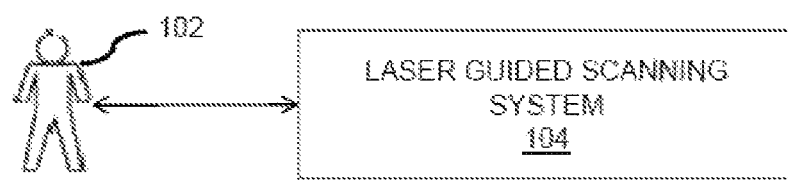

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). To facilitate understanding, like reference numerals have been used, where possible, to designate like elements common to the figures.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Reference throughout this specification to "a select embodiment", "one embodiment" or "an embodiment" means that a particular feature, structure, or characteristic described in connection with the embodiment is included in at least one embodiment of the disclosed subject matter. Thus, appearances of the phrases "a select embodiment" "in one embodiment" or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

All numeric values are herein assumed to be modified by the term "about," whether or not explicitly indicated. The term "about" generally refers to a range of numbers that one of skill in the art would consider equivalent to the recited value (i.e., having the same or substantially the same function or result). In many instances, the terms "about" may include numbers that are rounded to the nearest significant figure. The recitation of numerical ranges by endpoints includes all numbers within that range (e.g., 1 to 5 includes 1, 1.5, 2, 2.75, 3, 3.80, 4, and 5).

As used in this specification and the appended claims, the singular forms "a," "an," and "the" include or otherwise refer to singular as well as plural referents, unless the content clearly dictates otherwise. As used in this specification and the appended claims, the term "or" is generally employed to include "and/or," unless the content clearly dictates otherwise.

The following detailed description should be read with reference to the drawings, in which similar elements in different drawings are identified with the same reference numbers. The drawings, which are not necessarily to scale, depict illustrative embodiments and are not intended to limit the scope of the disclosure.

FIG. 1 illustrates an exemplary environment 100 where various embodiments of the present disclosure may function. As shown, the environment 100 primarily includes a user 102, a laser guided scanning system 104 for scanning of an object 106. The user 102 for scanning the object 106 may use the laser guided scanning system 104. In some embodiments, the user 102 may user the laser guided scanning system 104 for three-dimensional (3D) scanning of the object 106. In some embodiments, the user 102 accesses the laser guided scanning system 104 directly. The object 106 may be a symmetrical object and an unsymmetrical object. Though only one object 106 is shown, but a person ordinarily skilled in the art will appreciate that the environment 100 may include more than one object 106.

In some embodiments, the laser guided scanning system 104 is configured to 3D scan the object 106. In some embodiments, the laser guided scanning system 104 is configured to capture one or more images of the object 106 for completing a 360-degree view of the object 106. Further, in some embodiments, the laser guided scanning system 104 may be configured to generate 3D scanned models and images of the object 106. In some embodiments, the laser guided scanning system 104 may be a device or a combination of multiple devices, configured to analyse a real-world object or an environment and may collect/capture data about its shape and appearance, for example, colour, height, length width, and so forth. The laser guided scanning system 104 may use the collected data to construct a digital three-dimensional model. The laser guided scanning system 104 may indicate/signal the user 102 to take one or more shots or images of the object 106. For example, the laser guided scanning system 104 may turn to a green color for signaling an exact position to the user 102 for taking a number of shots including at least one image of the object 106 one by one. For taking each of the shots, the laser guided scanning system 104 points a green light to an exact location to the user 102 for taking the shot of the object 106. The laser guided scanning system 104 includes a laser light configured to switch from a first color to a second color to indicate or signal an exact position to the user 102 for taking a number of shots including at least one image of the object 106. In some embodiments, the first color may be a red color and the second color may be a green color. Further, the laser guided scanning system 104 may capture the shots based on the color and an input received from the user 102. Further, the laser guided scanning system 104 may define a laser center co-ordinate for the object 106 from a first shot of the shots. Further, the laser guided scanning system 104 may define the exact position for taking the subsequent shot without disturbing the laser center co-ordinate for the object. The exact position for taking the subsequent shot is defined without disturbing the laser center co-ordinate for the object 106. Further, the laser guided scanning system 104 is configured to define a new position co-ordinate of the user 102 based on the laser center co-ordinate and the relative width of the shot. The laser guided scanning system 104 may be configured to capture the one or more shots of the object 106 one by one based on an indication from the laser light. In some embodiments, the laser guided scanning system 104 may take subsequent shots of the object 106 one by one based on the laser center co-ordinate and a relative width of a first shot of the shots. The subsequent shots are taken one by one after the first shot. For each of the subsequent shots, the laser guided scanning system 104 may point a green laser light on an exact position for indicating the user 102 to take a shot. Furthermore, the laser guided scanning system 104 may capture multiple shots for completing a 360-degree view of the object 106. Furthermore, the laser guided scanning system 104 may stitch and process the multiple shots to generate at least one 3D model including a scanned image of the object 106.

Figure 2:
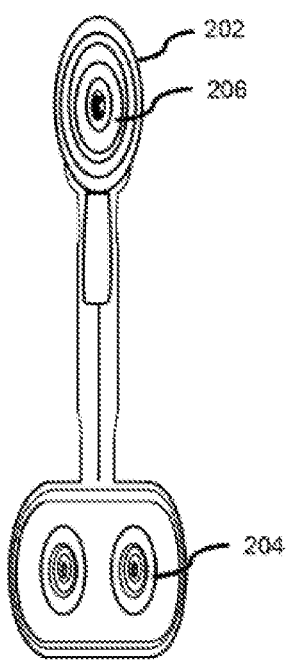
FIG. 2 illustrates a front view of an exemplary laser guided scanning system according to an embodiment of the present disclosure.

FIG. 2 illustrates a front view 200 of an exemplary laser guided scanning system 202 according to an embodiment of the present disclosure. As shown, the laser guided scanning system 202 includes multiple cameras 204. The laser guided scanning system 202 includes a laser light (not shown) for signaling a user to take shots of an object. The laser light may change from first color to the second color and vice versa. In some embodiments, the laser guided scanning system 202 may also include a button for taking shots and images of the object. The laser light may be configured to switch from a red color to a green color for signaling an exact position to the user for taking each of a subsequent shot of a plurality of shots comprising at least one image of the object, wherein the subsequent shot is taken after a first shot of the plurality of shots. The cameras 204 may be configured to capture the plurality of shots one by one when the laser light points an exact position via a green light, wherein the one or more cameras 204 takes the plurality of shots based on a laser center co-ordinate and a relative width of the first shot such that the laser center co-ordinate remains un-disturbed while taking the plurality of shots of the object.

The laser guided scanning system 202 may stitch and process the shots including the first shot and subsequent shots into an at least one 3D model comprising a scanned image of the object.

Figure 3:
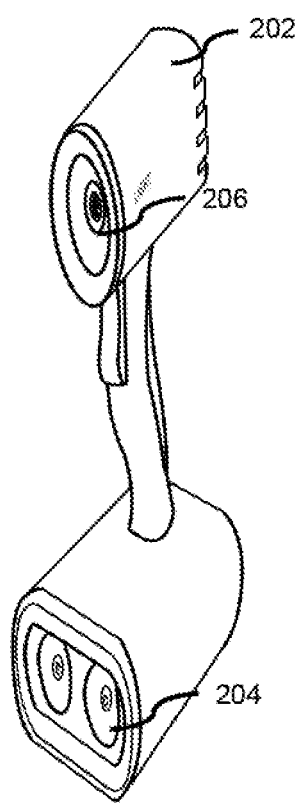
FIG. 3 illustrates a side view of the exemplary laser guided scanning system of FIG. 2.
Figure 4:
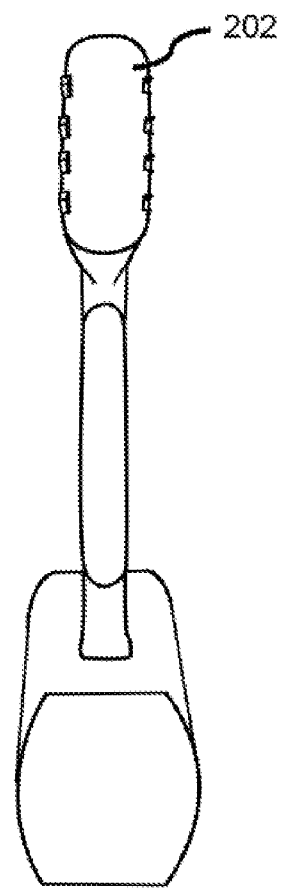
FIG. 4 illustrates a back view of the exemplary laser guided scanning system of FIG. 2.
Figure 5:
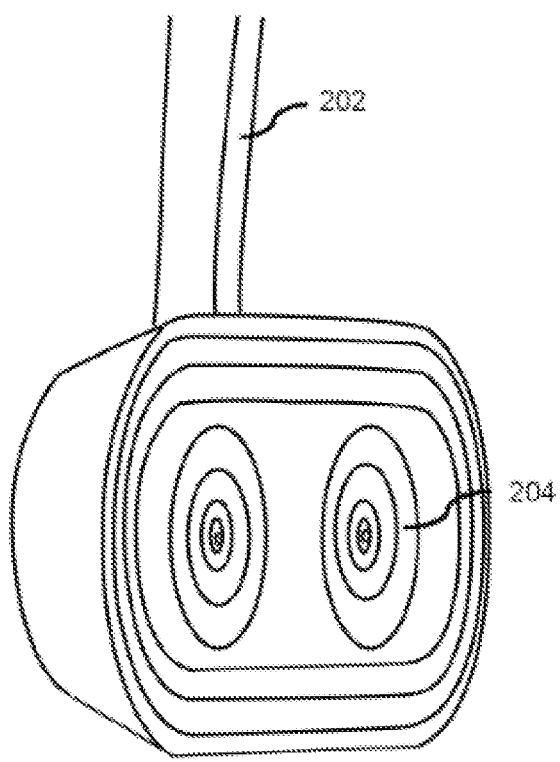
FIG. 5 illustrates a zoomed view of the exemplary laser guided scanning system of FIG. 2.

FIG. 3 illustrates a side view 300 of the exemplary laser guided scanning system 202 of FIG. 2. FIG. 4 illustrates a back view 400 of the exemplary laser guided scanning system 202 of FIG. 2. FIG. 5 illustrates a zoomed view 500 of the exemplary laser guided scanning system 202 of FIG. 2

Figure 6:
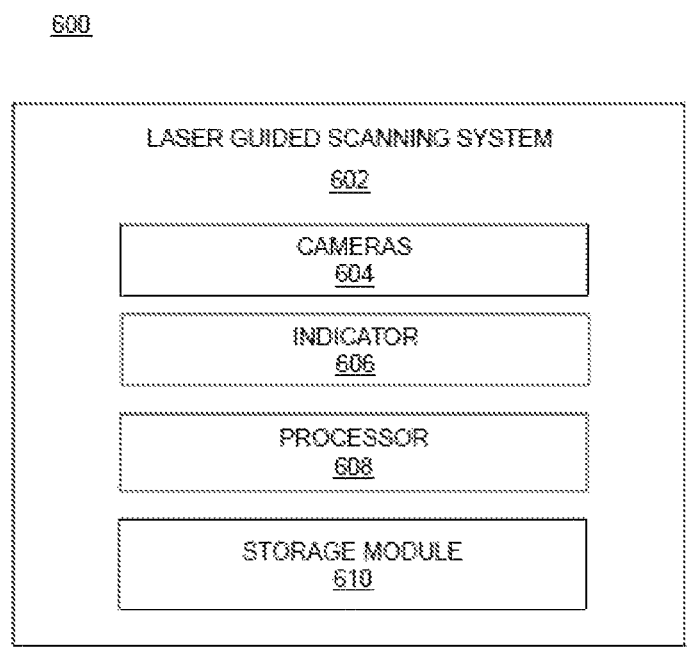
FIG. 6 is a block diagram illustrating system elements of an exemplary laser guided scanning system, in accordance with an embodiment of the present disclosure.

FIG. 6 is a block diagram 600 illustrating system elements of an exemplary laser guided scanning system 602, in accordance with an embodiment of the present disclosure. As shown, the laser guided scanning system 602 primarily includes one or more cameras 604, a laser light 606, a processor 608, and a storage module 610. As discussed with reference to FIG. 1, the user 102 may use the laser guided scanning system 602 for capturing 3D images of the object 106.

The laser light 606 may be configured to switch from a first color to a second color for indicating an exact position to the user 102 for taking a plurality of shots comprising at least one image of the object 106. In some embodiments, the laser light 606 may be configured to switch from a red color to a green color and vice versa, the laser light 606 switches from the red color to the green color for signaling an exact position to the user 102 for taking a subsequent shot of a plurality of shots comprising at least one image of the object 106. In some embodiments, the laser light 606 points a green light on the exact position for signaling the user 102 to take a next shot from the exact position. In some embodiments, the laser light 606 includes a laser light configured to switch from a red color to a green color and vice versa. In some embodiments, the laser light may be configured to user colors other than red and green for indicating the user 102. The object 106 may include at least one of a symmetrical object and an unsymmetrical object.

The one or more cameras 604 may be configured to capture the plurality of shots based on a color of the laser light 606. In some embodiments, the laser guided scanning system 602 may have only one camera 604. The one or more cameras 604 may further be configured to take the plurality of shots of the object 106 based on a laser center co-ordinate and a relative width of a shot of the plurality of shots. In some embodiments, the laser center co-ordinate may be kept un-disturbed while taking the plurality of shots of the object 106 after a first shot. For each of the shots, the laser light 606 indicates a green color at a position for taking the shot.

The processor 608 may be configured to define the laser center co-ordinate for the object 106 from a first shot of the plurality of shots. An exact position for taking the subsequent shot may be defined without disturbing the laser center co-ordinate for the object 106. The exact position may comprise one or more position co-ordinates. The processor 608 may also be configured to stitch and process the plurality of shots to generate at least one 3D model including a scanned image of the object 106. The processor 608 may also be configured to define a new position co-ordinate of the user 102 based on the laser center co-ordinate and the relative width of the shot.

The storage module 610 may be configured to store the images and 3D models. In some embodiments, the storage module 610 may be a memory. In some embodiments, the laser guided scanning system 602 may also include a button (not shown). The user 102 may capture the shots or images by pressing or touching the button.

Figure 7A:
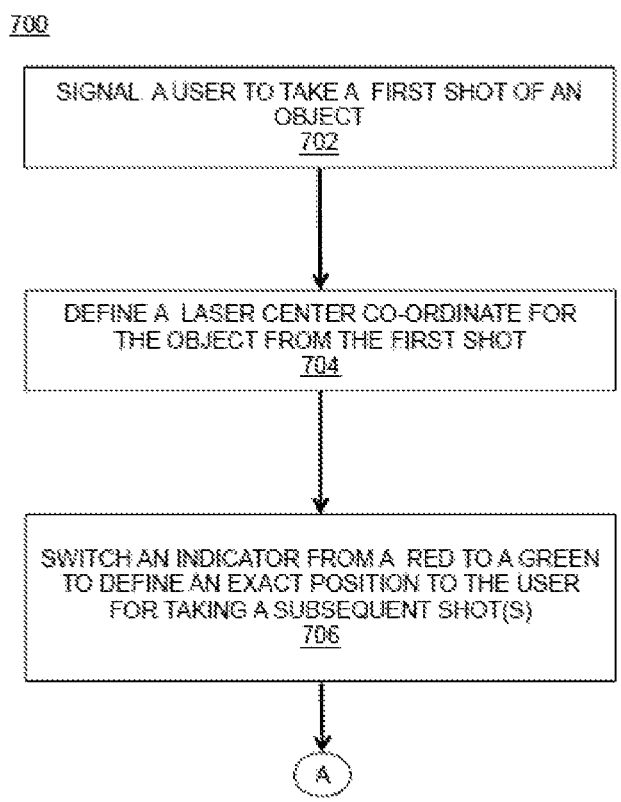
FIGS. 7A-7B illustrate a flowchart of a method for three-dimensional (3D) scanning of an object by using the laser guided scanning system of FIG. 6, in accordance with an embodiment of the present disclosure.
Figure 7B:
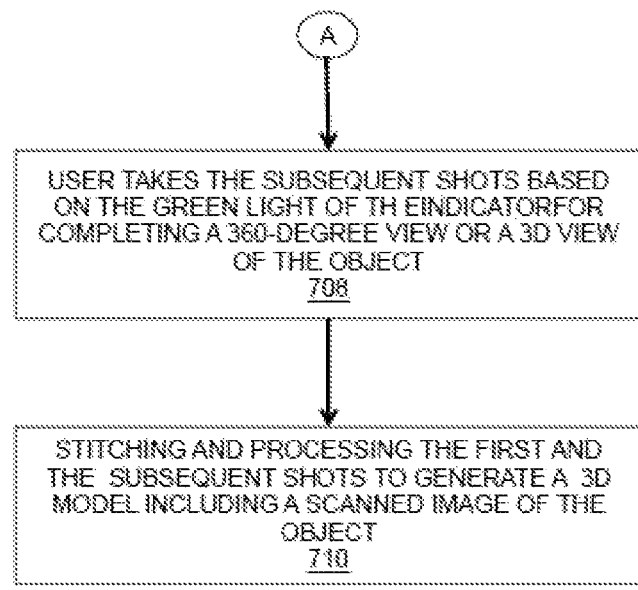

FIGS. 7A-7B illustrates a flowchart of a method 700 for a 3 dimensional (3D) scanning of an object by using a laser guided scanning system such as the laser guided scanning system 602 of FIG. 6, in accordance with an embodiment of the present disclosure.

At step 702, the laser light 606 of the laser guided scanning system 602 may signal a user, such as the user 102 of FIG. 1, to take a first shot. For example, the laser light 606 may switch to a green color from a red color. Then at step 704, the processor 608 may define a laser center co-ordinate for the object 106 from the first shot. At step 706, the laser light 606 switches from the red color to the green color to define exact position to the user 102 for taking one or more subsequent shots of the object 106. In some embodiments, the laser light 606 may target a green light to an exact position for indicating the user 102 to click the shot from that exact location.

Then at step 708, the user 102 may take subsequent shots based on the green color of the laser light for completing a 360-degree view of the object 106. The subsequent shots may be taken after the first shot of the object 106. Thereafter, at step 710, the first shot and the subsequent shots are stitched and processed to generate a three-dimensional (3D) model including a scanned image of the object 106.

Figure 8:
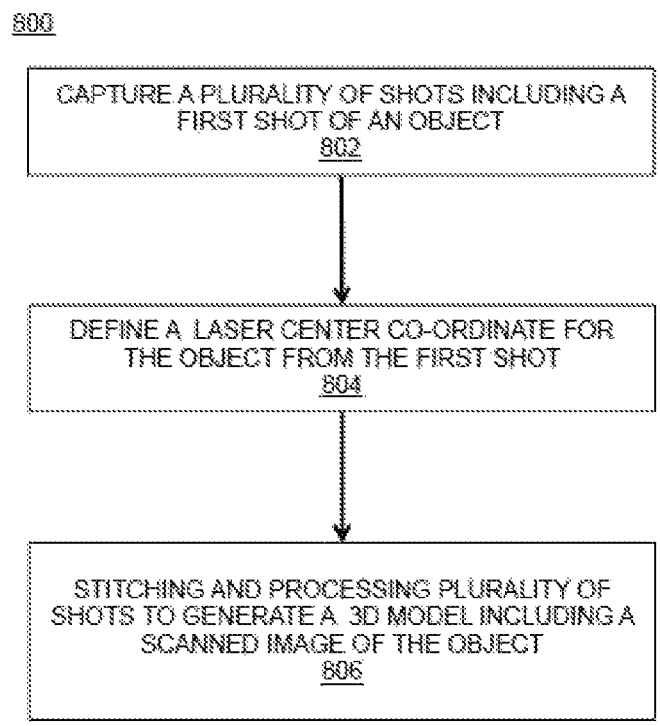
FIG. 8 illustrates a flowchart of a method for three-dimensional (3D) scanning of an object by using the laser guided scanning system of FIG. 6, in accordance with an embodiment of the present disclosure.

FIG. 8 illustrates a flowchart of a method 800 for 3 dimensional (3D) scanning of an object by using a laser guided scanning system such as the laser guided scanning system 602 of FIG. 6, in accordance with an embodiment of the present disclosure. As discussed in FIG. 6, the laser guided scanning system 602 includes the one or more cameras 604, the laser light 606, the processor 608, and the storage module 610.

At step 802, a plurality of shots including a first shot are captured when the laser light 606 switches from a first color to a second color for signaling an exact position to the user 102 for taking a subsequent or next shot. The laser light 606 turns to the second color such as, but not limited to, a green color pointing to an exact position for indicating the position to the user 102 for taking a subsequent or next shot. In some embodiments, the first color is a red color and the second color is a green color. Further, the plurality of shots includes at least one image of an object such as, the object 106 of FIG. 1. In some embodiments, the one or more cameras 604 takes the plurality of shots of the object 106 based on a laser center co-ordinate and a relative width of a first shot of the plurality of shots. The laser light 606 may be a laser light configured to switch from a green color to a red color and vice versa. Ins one embodiments, the laser light 606 turns green at a particular position for indicating the position to the user 102 for taking a next shot. In some embodiments, the plurality of shots is taken one by one with a time interval between two subsequent shots. For taking every next shot, the processor 608 may define a new position co-ordinate of the user 102 based on the laser center co-ordinate and the relative width of the shot. Further, the object 106 may comprise at least one of a symmetrical object and an unsymmetrical object.

Then at step 804, the laser center co-ordinate of the object 106 is defined, by the processor 608, from the first shot of the plurality of shots. The exact position for taking or capturing the subsequent shot is defined without disturbing the laser center co-ordinate for the object 106.

Thereafter, at step 806, the processor 608 stitches and processes the plurality of shots to generate at least one 3D model including a scanned image of the object 106.

Embodiments of the disclosure are also described above with reference to flowchart illustrations and/or block diagrams of methods and systems. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks. These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flowchart and/or block diagram block or blocks.

In addition, methods and functions described herein are not limited to any particular sequence, and the acts or blocks relating thereto can be performed in other sequences that are appropriate. For example, described acts or blocks may be performed in an order other than that specifically disclosed, or multiple acts or blocks may be combined in a single act or block.

While the invention has been described in connection with what is presently considered to be the most practical and various embodiments, it is to be understood that the invention is not to be limited to the disclosed embodiments, but on the contrary, is intended to cover various modifications and equivalent arrangements.

What is claimed is:

1. A laser guided scanning system for scanning of a plurality of objects, comprising:
   a laser light configured to switch from a first color to a second color to indicate an exact position to a user for taking a plurality of shots comprising at least one image of an object;
   one or more cameras configured to capture the plurality of shots one by one based on an indication from the laser light; and
   a processor configured to:
      define a laser center co-ordinate for the object from a first shot of the plurality of shots, wherein the exact position for taking the subsequent shot without disturbing the laser center co-ordinate for the object based on an indication from the laser light; and
      stitch and process the plurality of shots to generate at least one 3D model comprising a scanned image of the object;
   wherein the one or more cameras takes the plurality of shots of the object one by one based on the laser center co-ordinate and a relative width of a first shot of the plurality of shots, and the processor is further configured to define a new position co-ordinate for the user based on the laser center co-ordinate and the relative width of the first shot.

2. The laser guided scanning system of claim 1, wherein the laser light is configured to switch from a red color to a green color and vice versa.

3. The laser guided scanning system of claim 1, wherein the object comprises at least one of a symmetrical object and an unsymmetrical object.

4. A system for laser guided 3 dimensional (3D) scanning of an object, comprising:
   a laser light configured to switch from a red color to a green color for signaling an exact position to the user for taking each of a subsequent shot of a plurality of shots comprising at least one image of the object, wherein the subsequent shot is taken after a first shot of the plurality of shots;
   one or more cameras configured to capture the plurality of shots one by one when the laser light points an exact position via a green light, wherein the one or more cameras takes the plurality of shots based on a laser center co-ordinate and a relative width of the first shot such that the laser center co-ordinate remains undisturbed while taking the plurality of shots of the object; and
   a processor configured to:
      define the laser center co-ordinate for the object from the first shot, wherein the laser light indicates the exact position for taking the subsequent shot without disturbing the laser center co-ordinate of the object; and stitch and process the plurality of shots including the first shot and the subsequent shots into an at least one 3D model comprising a scanned image of the object;

wherein the processor is further configured to define a new position co-ordinate for the user based on the laser center co-ordinate and the relative width of the first shot.

5. The system of claim 4, wherein the object comprises at least one of a symmetrical object and an unsymmetrical object.

6. A method for scanning of a plurality of objects, comprising:

capturing, by one or more cameras of a laser guided scanning system, a plurality of shots one by one based on an indication of an exact position by a laser light, wherein the laser light switches from a first color to a second color for signaling the exact position to the user for taking a subsequent shot of the plurality of shots after a first shot of the plurality of shots, the one or more cameras takes the plurality of shots of the object one by one based on the laser center co-ordinate and a relative width of the first shot;

defining, by a processor of the laser guided scanning system, a laser center co-ordinate for the object from the first shot, wherein the processor defines the exact position for taking the subsequent shot without disturbing the laser center co-ordinate for the object;

defining, by the processor, a new position co-ordinate for the user based on the laser center co-ordinate and the relative width of the first shot; and stitching and processing, by the processor, the plurality of shots to generate at least one 3D model comprising a scanned image of the object.

7. The method of claim 6, wherein the laser light is configured to switch from a red color to a green color and vice versa.

8. The method of claim 6, wherein the object comprises at least one of a symmetrical object and an unsymmetrical object.

* * * * *